United States Patent [19]

Uchiyama

[11] 3,862,281

[45] Jan. 21, 1975

[54] VAPOR/LIQUID CONTACTOR

[76] Inventor: Takashi Uchiyama, 1085-6, Kayada-cho, Yachiyo, Japan

[22] Filed: Nov. 23, 1973

[21] Appl. No.: 418,449

[52] U.S. Cl. .... 261/114 VT, 137/512.1, 137/533.17
[51] Int. Cl................................................ B01f 3/04
[58] Field of Search ........... 261/114 VT; 137/512.1, 137/533.17

[56] References Cited
UNITED STATES PATENTS

| 3,080,155 | 3/1963 | Glitsch et al. | 261/114 VT |
| 3,087,711 | 4/1963 | Glitsch | 261/114 VT |
| 3,245,669 | 4/1966 | Huggins et al. | 261/114 VT |
| 3,399,871 | 9/1968 | Bon | 261/114 VT |
| 3,530,879 | 9/1970 | Nutter | 137/533.17 |

Primary Examiner—Tim R. Miles
Attorney, Agent, or Firm—Moonray Kojima

[57] ABSTRACT

A vapor/liquid contactor, in which the tray is formed from the same plate as the valve plate. The tray is removed from the plate, turned over and suitably positioned on the plate over the hole left by the removal of the tray. Supports are formed at the edges of the tray at angles, which in the turned over position, enables the tray to rest on the plate. Blow-off stoppers are formed either extending from the plate or the tray, bent and inserted through the removed portions corresponding to the stoppers. Either T-shaped end or bent I-shaped ends are used as stoppers. The removed portions corresponding to the ends may be covered with another plate.

10 Claims, 10 Drawing Figures

PATENTED JAN 21 1975

VAPOR/LIQUID CONTACTOR

BACKGROUND OF THE INVENTION

This invention relates to vapor/liquid contactors of the type employing valve trays.

It is known that the efficiency of valve trays is sustained at a higher level over a wide range of vapor/liquid loading fluctuations, in comparison to peforated trays, jet trays and grid trays. Also, the cost of valve trays is lower than conventional bubble cap trays. On the other hand, valve trays are usually more expensive than perforated trays, jet trays and grid trays.

Prior valve trays ordinarily have valve plate diameters which are larger than the diameters of the tray's orifice (there are a few exception, such as Japanese Patent Announcement 42/523, FIGS. 1,2 and 3). Therefore, usual valve trays are usually made of separate materials for the tray plate and for the valve plate. It is impossible to make valve trays using only one plate for both the valve plate and the tray.

SUMMARY OF THE INVENTION

This invention encompasses a vapor/liquid contactor employing valve trays and aims to overcome the above and other deficiencies of the prior art.

According to the invention a valve plate and a tray are both formed, such as by punching, from the same plate. The plate from which the tray is punched out, also forms the orifice zone and is used for the valve plate. Thus, advantageously, this invention substantially reduces the cost of materials.

Furthermore, manufacturing of this valve is simple; the manufacturing steps are such simple steps as punching, turning over and bending. No special manufacturing techniques or equipment is necessary, such as welding and adjusting. Thus, this invention substantially reduces manufacturing costs.

Moreover, advantageously, this invention may be used in different applications, such as for fractionators, absorbers, strippers, splittors, skimmers, and extractors.

DETAILED DESCRIPTION OF PREFERRED EMBODIMENTS

Figure 1:
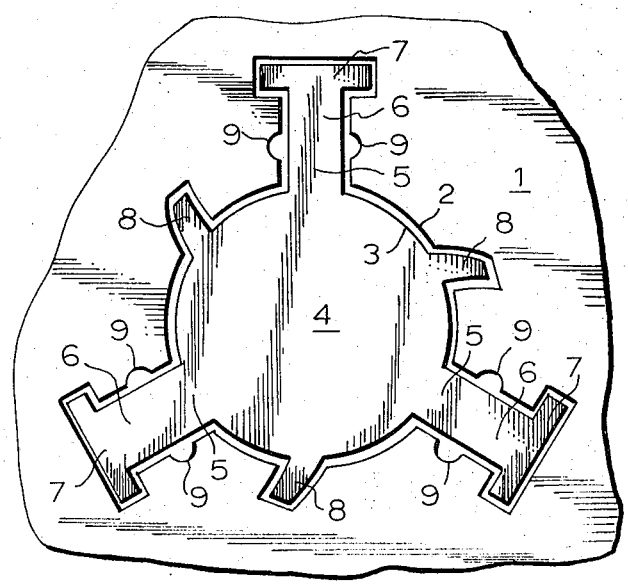
FIG. 1 depicts a plan view of a plate valve after the tray has been removed.
Figure 2:
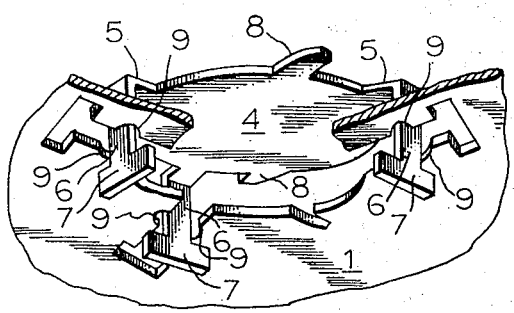
FIG. 2 depicts pictorially, placement of the tray over the plate valve in an operative condition.

FIG. 1 shows a valve plate 1 after removal, such as by punching, of tray 4. The removed area 2 forms an orifice of the valve. Unibody 3 is removed from the plate 1 and consists of valve tray 4, rotation stop legs 5, guide legs 6, blow-off stoppers 7 and support projections 8. The unibody 3 is used as a valve tray and the plate 1 forms the valve plate as shown in FIG. 2. There is no loss of material since out of the same material or plate is formed the valve plate and the tray.

To construct the valve, the unibody 3 is first removed, such as by punching, cutting, etc., from plate 1. Then, the unibody 3 is turned over and positioned above plate 1 as shown in FIG. 2. The projecting parts 8 overlap the edges of the orifice 2 so that tray 4 is in one position resting on plate 1 covering orifice 2, without falling through the hole 2 created by the removal of the tray therefrom. The stoppers are appropriately bent toward 120° at a distance from the edge equal to the length of rotation stop 5, which distance is sufficient to align the guide leg portion 6 with the slightly widened openings 9. Then, the tray is placed with the stopper legs 7, 6 in alignment with the widened openings 9 of plate 1, and then the legs are bent to the right angles as shown in FIG. 2. In this manner, the T ends of stopper 7 will stop the tray 4 at the distance of leg 6, when the valve blows off. The placement of the tray and stopper legs can be effected also in any other convenient manner; the foregoing manner being only an illustrative preferred manner. The widened clearances 9 are preferably removed at the same time the tray 4 is removed from plate 1. The dimensions should be suitable for smooth lifting and dropping of legs 6 therethrough and smooth movement of tray 4 in operation.

The first embodiment is a low cost valve tray. The orifice is not a complete circle such as those of the usual valve trays. This orifice edge is longer than the others having the same diameters. Thus, high vapor load tray efficiency is possible. But, it was discovered that at extremely low vapor load, tray efficiency of this embodiment may not be sustained at a high level because the T opening which is the area in plate 1 from which the T end of stopper 7 is taken, and which is formed when the tray 4 and plate 1 are closed, is as large as the hole of conventional perforated trays. Thus, dumping phenomena which brings about poor tray efficiency occurs.

Figure 3:
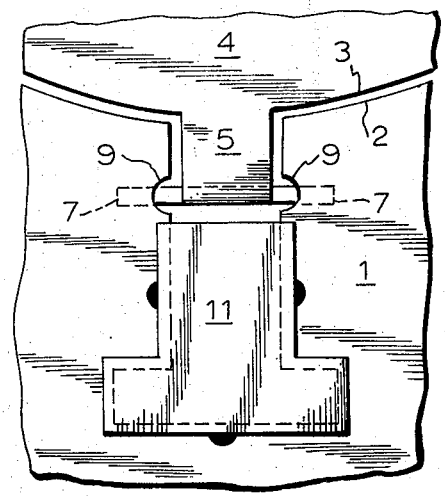
FIG. 3, depicts the embodiment of FIGS. 1 and 2, in which the hole left by the end of the blow-off stopper is closed.

A second embodiment improves the above mentioned weak point by securing, such as by welding, another plate 11 over the opening made by the punched out portion of plate 1 corresponding to the T end of stopper 7, as depicted in FIG. 3.

Figure 4:
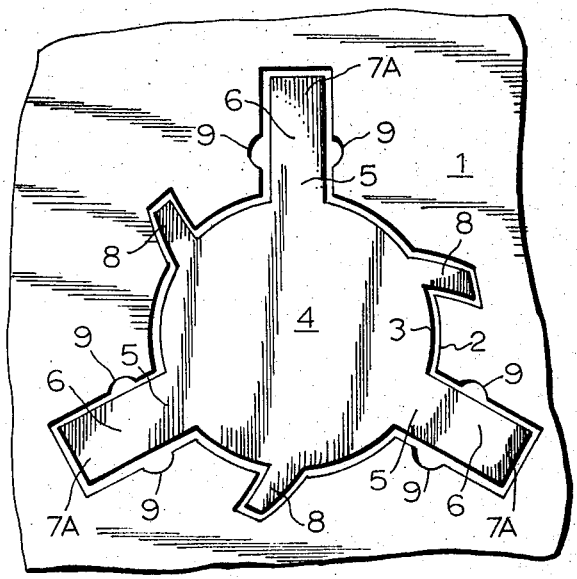
FIGS. 4 and 5, depict an embodiment similar to FIGS. 1 and 2, except the stopper ends are straight instead of being T-shaped.
Figure 5:
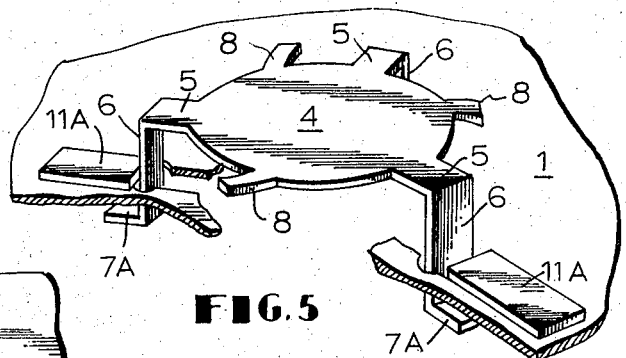

FIGS. 4 and 5 depict a third embodiment wherein the stopper leg ends 7A are straight, instead of being T-shaped as in the first embodiment of FIGS. 1 and 2. The portions removed from plate 1 corresponding to the stopper legs 7A may be covered securely, such as by welding, with plate 11A. The same numerals are used in FIGS. 1–5, to depict similar elements.

Figure 6:
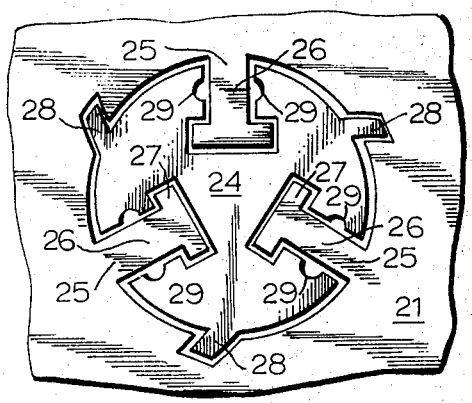
FIGS. 6, 7 and 8, depict embodiments similar to FIGS. 1,2 and 3 except the stopper legs are formed extending from the valve plate instead of the tray.
Figure 7:
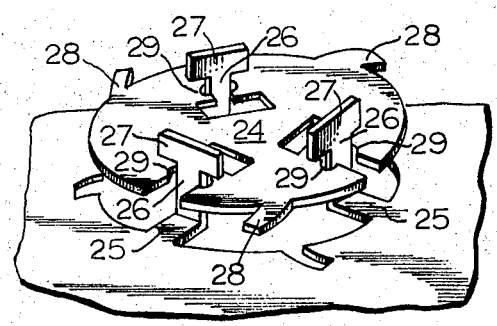
Figure 8:
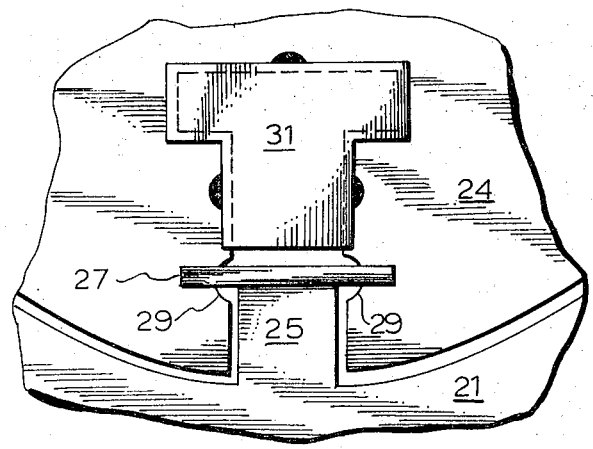

FIGS. 6, 7 and 8, depict a fourth embodiment similar to those of FIGS. 1,2 and 3, except that the stopper legs 25,26,27 are formed extending from plate 21, instead of from tray 4 as in FIGS. 1,2 and 3. Upon forming and removal of tray 24, the tray is turned over so that support projections 28 will prevent the tray from falling through the orifice created by its own removal from plate 21. The stopper legs 26,27 are bent at length 25 at about 120°, then the tray is placed on the legs 26,27, aligned with the holes created by the removal of the legs, and the legs are then bent at right angles at the distance of leg 25 from the edge and with support portion 26 at a suitable length. The T stopper end will now securely hold tray 24 at the blow-off position. The hole in tray 24 left by the T stopper end may be securely covered, such as by welding, with a piece 31 of suitable material, such as shown in FIG. 8.

Figure 9:
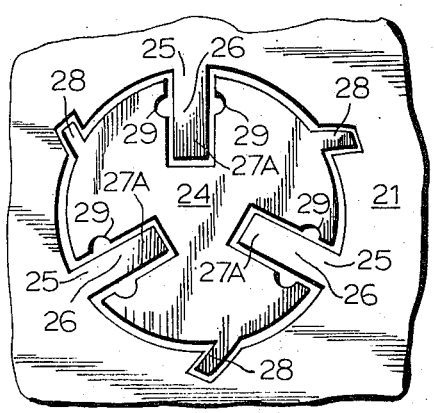
FIGS. 9 and 10 are similar to embodiments of FIGS. 4 and 5, except the stopper legs are formed extending from the valve plate instead of from the tray.
Figure 10:
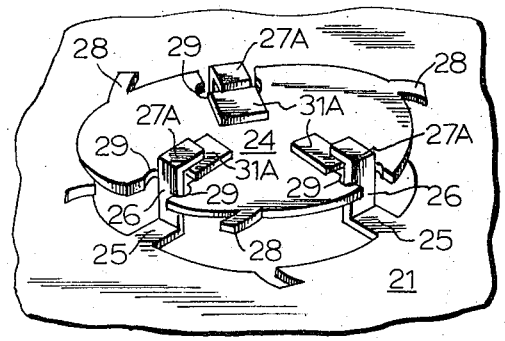

FIGS. 9 and 10 depict a fifth embodiment similar to FIGS. 4 and 5, except that the stoppers 25,26,27A extend from plate 21 instead of tray 24. The stoppers also have straight ends 27A instead of T shaped ends as in FIGS. 6,7 and 8. The holes left by the stopper ends when same are removed from tray 24 are shown securely covered, such as by welding, by pate 31A. The same numerals are used to depict similar elements in FIGS. 6–10.

In the foregoing embodiments, the valve plate, tray and covering plate may be made of any suitable material, such as metal, The tray may be suitably cut, formed, punched, etc. from the plate. Advantageously, the plate from which the tray is obtained forms the other part of the valve. Thus, considerable savings in material and manufacturing costs are effected. Also, the distance of lift off of the tray above the plate may be suitably adjusted, by adjusting the stopper legs length.

The foregoing description is intended to illustrate the principles of this invention. Numerous other variations and modifications would be apparent to one skilled in the art. All such modifications and variations are to be considered to be within the spirit and scope of this invention.

What is claimed is:

1. A vapor/liquid contactor, comprising a plate and a tray formed from said plate and turned over and positioned above said plate, said tray having at least two support means extending therefrom and at an angle enabling said tray to rest on said plate in said turned over position, and at least two blow-off stoppers, said blow-off stoppers comprising extensions of said tray bent at least once at a right angle whereby said tray in a first position rests upon said plate above an orifice created by said tray being removed from said plate, with said stopper extending below said plate and in a blow-off position a portion of said stopper is held against the bottom surface of said plate with an opening between said plate and said tray.

2. Contactor of claim 1, wherein said plate has a slightly enlarged opening at the sides of portions corresponding to said stopper to enable said stopper to pass through said plate prior to a second bending thereof to a right angle.

3. Contactor of claim 1, wherein said portion of said stopper used to hold tray in said blow-off position is a T shaped end of said stopper.

4. Contactor of claim 3, wherein a T-shaped removed portion of said plate corresponding to said T portion of said stopper is covered securely by another plate means.

5. Contactor of claim 1, wherein said portion of said stopper used to hold said tray in said blow-off position is an end portion thereof bent to a second right angle and wherein the removed portion of said plate corresponding to said end portion is covered securely with another plate means.

6. A vapor/liquid contactor comprising plate means and tray means formed from said plate means and turned over and positioned above said plate covering an orifice left by said tray means being removed from said plate means, said tray means having at least two supports extending therefrom and at an angle enabling said tray means to rest on said plate means in said turned over position, said plate means having at least two blow-off stoppers comprising elongated portions extending from said plate means into the area left by said tray means and bent at least once at a right angle, said tray means being fit over said plate means with said stoppers inserted through the openings left by said stoppers, whereby in one position said tray means rests against said plate means and in a blow-off position said tray means is held by a portion of said stopper, with an opening between said tray means and said plate means.

7. Contactor of claim 6, wherein said tray means has a slightly enlarge opening at the sides at the removed portions corresponding to said stopper to enable said stopper to pass through said tray means prior to a second bending of said stopper.

8. Contactor of claim 6, wherein said portion of said stopper used to hold said tray means in said blow-off position is a T-shaped of said stopper.

9. Contactor of claim 8, wherein a T-shaped removed portion of said tray means corresponding to said T portion of said stopper is covered securely by another plate means.

10. Contactor of claim 6, wherein said portion of said stopper used to hold said tray means in said blow-off position is an end portion bent to a second right angle and wherein the removed portion of said plate means corresponding to said end portion is securely covered with another plate means.

* * * * *